US008584958B2

(12) United States Patent
Yang

(10) Patent No.: US 8,584,958 B2
(45) Date of Patent: Nov. 19, 2013

(54) EAS TAG WITH TWIST PREVENTION FEATURES

(75) Inventor: Xiao Hui Yang, Saratoga, CA (US)

(73) Assignee: WG Security Products, Campbell, CA (US)

(*) Notice: Subject to any disclaimer, the term of this patent is extended or adjusted under 35 U.S.C. 154(b) by 0 days.

(21) Appl. No.: 13/428,918

(22) Filed: Mar. 23, 2012

(65) Prior Publication Data

US 2012/0241522 A1 Sep. 27, 2012

Related U.S. Application Data

(60) Provisional application No. 61/467,958, filed on Mar. 25, 2011.

(51) Int. Cl.
*G06K 19/06* (2006.01)

(52) U.S. Cl.
USPC .......................................... 235/492; 235/487

(58) Field of Classification Search
USPC ................................................. 235/487, 492
See application file for complete search history.

(56) References Cited

U.S. PATENT DOCUMENTS 3,708,835 A 1/1973 Bienz
4,196,424 A 4/1980 Williamson
4,263,697 A 4/1981 Speedie
4,441,233 A 4/1984 Swift
4,493,739 A 1/1985 Fujiwara et al.
4,494,487 A 1/1985 Nixon
4,506,415 A 3/1985 Swift
5,337,503 A 8/1994 Goby
5,524,463 A 6/1996 Schenkel et al.
5,568,951 A 10/1996 Morgan
5,570,080 A 10/1996 Inoue
5,627,520 A 5/1997 Grubbs et al.
5,717,382 A 2/1998 Cooper
5,856,782 A 1/1999 Sasagawa et al.
5,945,909 A 8/1999 Kolton
5,949,336 A 9/1999 Deschenes et al.
5,959,532 A 9/1999 Fujiuchi
5,969,613 A 10/1999 Yeager et al.
5,995,003 A 11/1999 Rogers
6,025,781 A 2/2000 Deschenes
6,052,876 A 4/2000 Hogan et al.
6,188,320 B1 2/2001 Kolton et al.
6,326,890 B1 12/2001 Costa
6,535,130 B2 3/2003 Nguyen et al.
D478,828 S * 8/2003 Yang et al. .............. D10/106.91
D478,829 S 8/2003 Yang et al.

(Continued)

*Primary Examiner* — Daniel Hess
*Assistant Examiner* — Paultep Savusdiphol
(74) *Attorney, Agent, or Firm* — Robert R. Waters; Brian W. Foxworthy; Waters Law Group, PLLC

(57) ABSTRACT

An EAS tag includes a cap with a tack shaft and a body with a clutch for receiving and retaining the tack shaft. An aperture in the body gives access to the clutch. The cap is concave and shaped to fit over the body, and the tack shaft extends into the concavity of the cap. The shape of the body and cap and the position of the tack shaft provide an initial resistance to twisting the cap with respect to the body. Both the cap and body may have additional features with interact or interlock to prevent the cap from being twisted. Additional, the cap may have areas of reduced thickness to induce breaking away of parts of the cap when excessive stress is induced in the cap.

11 Claims, 8 Drawing Sheets

(56) References Cited

U.S. PATENT DOCUMENTS

| | | | | |
|---|---|---|---|---|
| 6,624,753 | B2 | 9/2003 | Elston | |
| 6,631,629 | B1 | 10/2003 | Fuss et al. | |
| 6,724,311 | B1 | 4/2004 | Kolton et al. | |
| 6,731,212 | B2 | 5/2004 | Hirose | |
| D502,419 | S | 3/2005 | Copen | |
| D503,900 | S | 4/2005 | Sayegh | |
| D504,634 | S | 5/2005 | Sayegh | |
| D504,839 | S | 5/2005 | Sayegh | |
| D505,349 | S | 5/2005 | Sayegh | |
| 6,933,847 | B2 | 8/2005 | Feibelman | |
| D509,454 | S | 9/2005 | Sayegh | |
| 7,005,989 | B2 | 2/2006 | Benoit et al. | |
| 7,062,823 | B2 | 6/2006 | Copen | |
| 7,183,914 | B2 | 2/2007 | Norman et al. | |
| 7,190,272 | B2 | 3/2007 | Yang et al. | |
| 7,227,467 | B2 | 6/2007 | Feibelman | |
| 7,249,401 | B2 | 7/2007 | Copen | |
| 7,286,055 | B2 | 10/2007 | Girvin et al. | |
| 7,342,495 | B2 | 3/2008 | Sayegh | |
| D566,598 | S | 4/2008 | Sayegh | |
| D567,128 | S | 4/2008 | Sayegh | |
| 7,400,254 | B2 | 7/2008 | Yang et al. | |
| D578,030 | S | 10/2008 | Yang | |
| 7,474,222 | B2 | 1/2009 | Yang et al. | |
| 7,518,521 | B2 | 4/2009 | Feibelman et al. | |
| D599,242 | S | 9/2009 | Yang | |
| 7,595,733 | B2 | 9/2009 | Spagna | |
| 7,626,501 | B2 | 12/2009 | Feibelman | |
| D612,759 | S | 3/2010 | Handyside | |
| 7,671,741 | B2 | 3/2010 | Lax et al. | |
| 7,724,146 | B2 | 5/2010 | Nguyen et al. | |
| D624,447 | S | 9/2010 | Yang | |
| 7,808,390 | B2 | 10/2010 | Sayegh | |
| 7,969,310 | B2 | 6/2011 | Sayegh | |
| 7,990,273 | B2 * | 8/2011 | Handyside et al. | 340/572.9 |
| 2005/0270161 | A1 * | 12/2005 | Yang et al. | 340/572.9 |
| 2006/0070410 | A1 | 4/2006 | Fuss et al. | |
| 2007/0051644 | A1 * | 3/2007 | Burdett et al. | 206/308.2 |
| 2007/0096925 | A1 * | 5/2007 | Yang et al. | 340/572.9 |
| 2009/0058659 | A1 * | 3/2009 | Handyside et al. | 340/572.9 |
| 2009/0160644 | A1 | 6/2009 | Yang | |
| 2009/0289798 | A1 | 11/2009 | Yang | |
| 2010/0171621 | A1 | 7/2010 | Yang | |
| 2010/0308998 | A1 | 12/2010 | Hesch, Jr. et al. | |
| 2010/0315237 | A1 | 12/2010 | Yang | |
| 2010/0315238 | A1 | 12/2010 | Yang | |
| 2010/0315239 | A1 | 12/2010 | Yang | |
| 2011/0115632 | A1 | 5/2011 | Yang | |
| 2011/0227706 | A1 | 9/2011 | Yang | |

* cited by examiner

EAS TAG WITH TWIST PREVENTION FEATURES

CROSS REFERENCE TO RELATED APPLICATIONS

This application claims priority from U.S. Provisional Application 61/467,958, filed on Mar. 25, 2011. The entire disclosures contained in U.S. Provisional Application 61/467,958, including any attachments thereto, are incorporated herein by reference.

FIELD OF THE INVENTION

This invention relates generally to electronic article surveillance. More specifically, this invention relates to an electronic article surveillance tag comprised of two parts having features that prevent their being twisted with respect to each other, once assembled.

BACKGROUND OF THE INVENTION

A common logistical concern in businesses is the tracking of assets or persons. In retail, one example of this logistical tracking concern is shoplifting. Many retail establishments employ electronic tags attached to goods that can be detected by systems installed for that purpose. A common term for these systems, tags, etc. is electronic article surveillance, or EAS.

Many of these tags and systems are only capable of registering the presence of the tag. Transmitters and receivers are located at exit points within a retail environment and the transmitter creates an interrogation zone at the exits while the receivers scan for responses from tags passing through the interrogation zone. The transmitters and receivers are typically housed in pedestals. There are several types of tags for these systems, one of which is a harmonic tag and another of which is a resonance tag. With the harmonic tag, the electromagnetic interrogation field creates stored energy in the harmonic tag, and when the interrogation field is turned off this energy dissipates from the tag and produces a signal which is a harmonic of the interrogation field. The element that stores and dissipates the energy to generate the signal is typically comprised of a ferrite core with a wire coil around it, and it can be tuned to generate a signal at a particular frequencies. The system is tuned to the expected frequencies, and the receiver antennas of the system detect these signals. When a signal is detected within an interrogation field, it is assumed that a tag is present and that it is improperly being removed from the retail facility. Similar systems may also be used to identify authorized personnel at control points, etc.

There are many ways used to attach a tag to an article being protected. For clothing and similar items, a tag incorporating a tack is frequently used. The tack has a head and shaft extending from its head, while the tag body houses a clutch and has an aperture through which the tack shaft may be inserted into the clutch. Various clutches are employed in the art, and depending on the particular clutch, the clutch may be released by mechanical means, application of a magnet to the clutch, or some clutches may be released by multiple methods.

One clutch that is frequently used is a ball clutch. In a ball clutch, a spindle is located in the interior of a tapered cup which is opened at its larger end and has an aperture through its smaller, closed end. The spindle has a shaft through it which is aligned with the aperture of the tapered cup. Both the aperture in the tapered cup and the shaft through the spindle are at least large enough to accommodate the insertion of the tack shaft. The spindle has apertures through its walls which carry ball bearings that ride on the interior of the tapered cup. When the tack shaft is inserted the spindle moves to allow shaft in, but if the shaft is pulled, the ball bearings, the tack, and tapered cup wedge. The spindle must be retracted prior to pulling the tack in order for there to be space among the elements within the tapered cup to allow the removal of the tack shaft. In many ball clutches, the spindle is at least partially made of a magnetically attractable material, which allows it to be retracted by application of a magnet.

In many applications, it is desirable that the EAS tag be as small as possible. However, due to the shapes and sizes of the internal elements, the possible arrangements of the internal elements are limited. Some of these possible arrangements result in tag shapes which are vulnerable to tampering. For example, a tag with an elongated shape can provide sufficient purchase so that the tack and body portions can be gripped and twisted to separate the two portions. The embodiments of the current invention incorporate certain anti-twisting features to prevent tampering with a compactly configured EAS tag.

SUMMARY OF THE INVENTION

Embodiments of the present invention have a tag body and a tag cap. The tag body houses a clutch and an EAS electronic element. The tag cap is cupped and generally shaped to match that of the tag body. A tack shaft extends from the concave side of the tag cap. A top panel on the tag body has an aperture through which the tack shaft is inserted into the tag body and into the clutch within the tag body. To release the clutch, a magnet is applied to the tag body opposite to the tag cap.

The shapes of the internal elements result in a tag body having an oblong shape. Unfortunately, this shape can facilitate the twisting of the tag cap and tag body with respect to each other. To frustrate the twisting the relative twisting of the two portions, the top panel in the tag body has at least one male feature extending from its surface. The tag cap has at least one female feature within its interior sized and located to accept the male features of the tag body.

These features are joined when the tag cap is assembled to the tag body, and prevent the rotation of the two portions with respect to each other. Additionally, the tag cap and tag body are so shaped that the edges of the tag cap fit the shape of the tag body to minimize any gap, further reducing opportunities for prying the portions apart.

DETAILED DESCRIPTIONS OF THE EMBODIMENTS

The detailed description below of certain embodiments is intended to explain the current invention. It is to be understood that a variety of other arrangements are also possible without departing from the spirit and scope of the invention.

Figure 1:
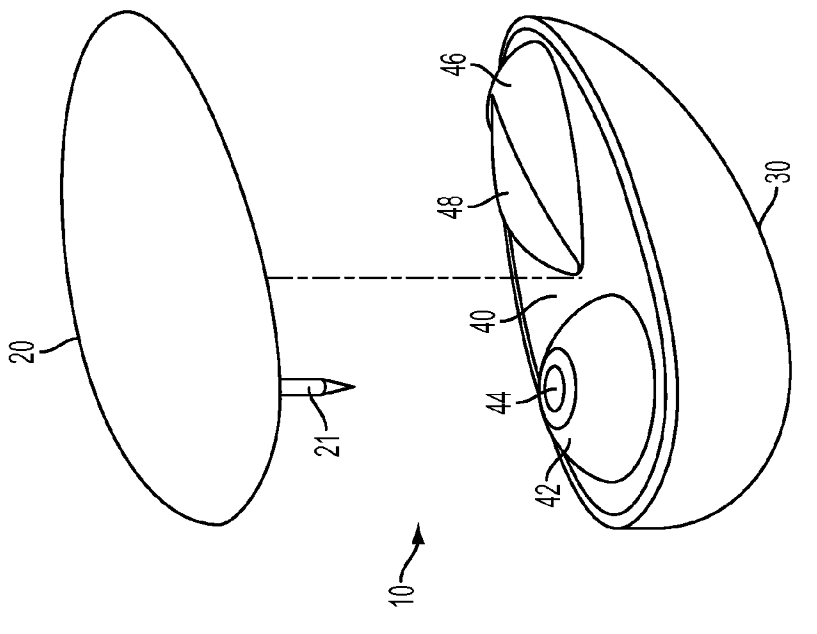
FIG. 1 is a perspective view of an EAS tag cap and body positioned as if ready to be assembled or as if after disassembly.

FIG. 1 is a perspective view of an embodiment of an EAS tag 10 having twist prevention features. In FIG. 1, tag cap 20 and tag body 30 are positioned as if ready to be assembled or as if after disassembly. Tack shaft 21 extends from the interior of tag cap 20. Tag cap 20 and tag body 30 have a matching oval outline. Tack shaft 21 extends from the underside of tag cap 20 and is centered in the larger end of the oval of tag cap 20. Aperture 44 in the top surface of tag body 30 is centered in the larger end of the oval of tag body 30 and aligns with tack shaft 21 to receive tack shaft 21 when tag cap 20 is assemble with tag body 30. The location of tack shaft 21 and aperture 44 in the large end of the oval outline and the oblong shape of the oval provide a resistance to twisting about tack shaft 21 when tag cap 20 is joined to tag body 30.

Top panel 40 of tag body 30 is shaped to accommodate elements within the interior of tag body 30. Clutch dome 42 accommodates a clutch beneath it, while elongate dome 46 accommodates an EAS signal element beneath it. Aperture 44 provides tack shaft 21 access to the clutch. When tag cap 20 is assembled to tag body 30, elongate dome 46 extends up into tag cap 20 which provides further resistance to twisting of tag cap 20 and tag body 30 about tack shaft 21.

Figure 2:
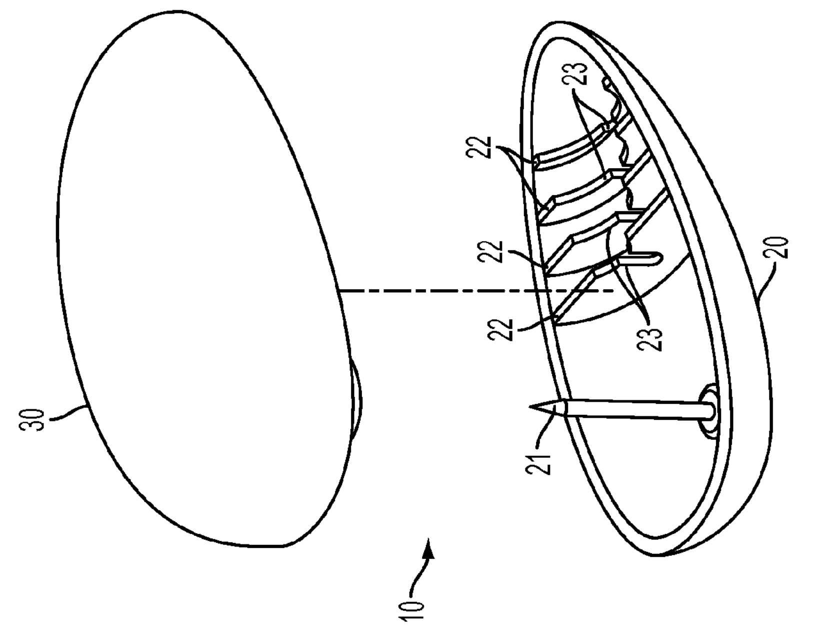
FIG. 2 is a perspective view similar to that of FIG. 1, but the EAS tag body is above the tag cap and the interior of the cap is visible.

Turning now to FIG. 2, the interior of tag cap 20 may be seen. Around tack shaft 21, tag cap 20 has sufficient room to accommodate clutch dome 42 of tag body 30. In the area of tag cap 20 which covers elongate dome 46 of tag body 30, tag cap 20 has several ribs 22 running across its width. Ribs 22 are contoured to accommodate elongate dome 46 of top panel 40 of tag body 30. The fitting of elongate dome 46 into ribs 22 provides an additional resistance to twisting of tag cap 20 and tag body 30 about tack shaft 21.

In the embodiment shown in FIGS. 1 and 2, extending upward from elongate dome 46 is male feature 48. In FIG. 1, male feature 48 is a ridge running along elongated dome 46. In FIG. 2, tag cap 20 has a female feature to match and receive male feature 48 of tag body 30. In the embodiment shown in FIG. 2, ribs 22 of tag cap 20 each have a female feature in them in the form of slots 23. In combination, slots 23 in ribs 22 are able to accommodate male feature 48 of tag body 30.

The interaction of male feature 48 of tag body 30 and the female feature of tag cap 20, slots 23 of ribs 22, prevents the rotation of tag cap 20 with respect to tag body 30. This prevents the two portions of Eas tag 10 from being rotated with respect to each other to acquire a better hold to force them apart. Additionally, this prevents them from being wiggled with respect to each other to work tack shaft 21 out of the clutch in tag body 30.

Figure 4:
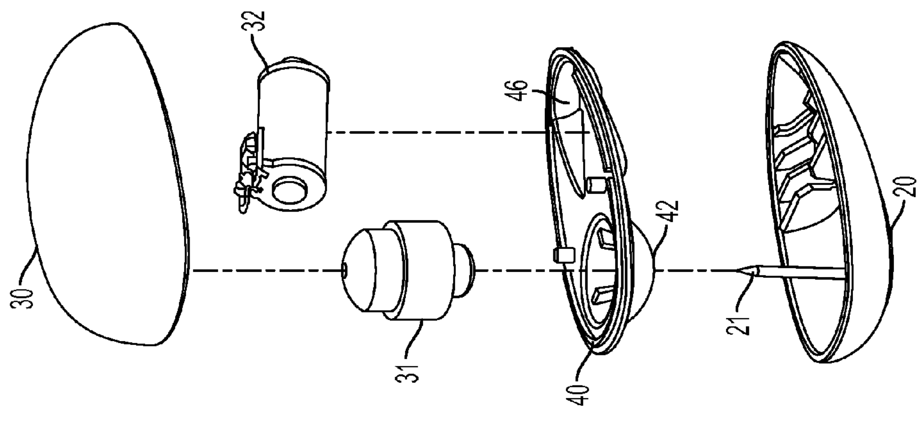
FIG. 4 is an exploded perspective view of the EAS tag of FIGS. 1, 2, and 3.
Figure 3:
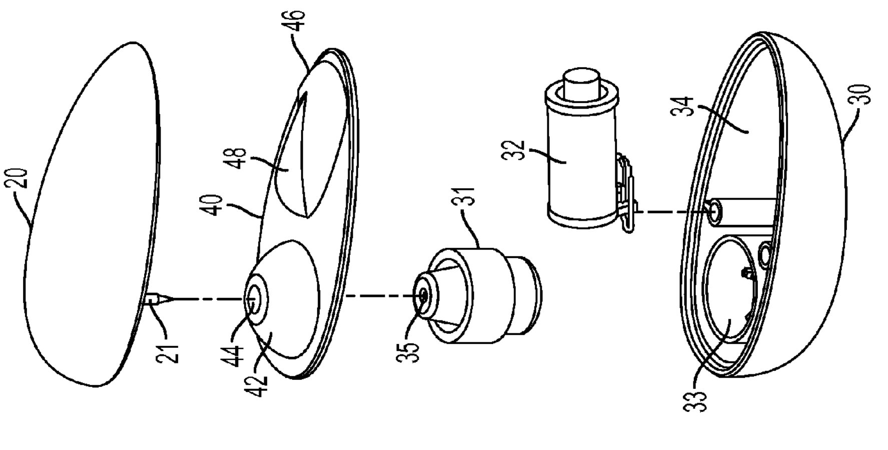
FIG. 3 is an exploded perspective view of the EAS tag of FIGS. 1 and 2.

Referring now to FIGS. 3 and 4 the arrangement of elements internal to tag body 30 may be seen. Clutch 31 is located between clutch dome 42 of top panel 40 and clutch bowl 33 in the interior of tag body 30. EAS signal element 32 is between elongate dome 46 of top panel 40 and chamber 34 in the interior of tag body 30. Clutch 31 has clutch aperture 35 to allow tack shaft 21 access to the interior of clutch 31. Clutch aperture 35 aligns with aperture 44 in top panel 40.

Figure 5:
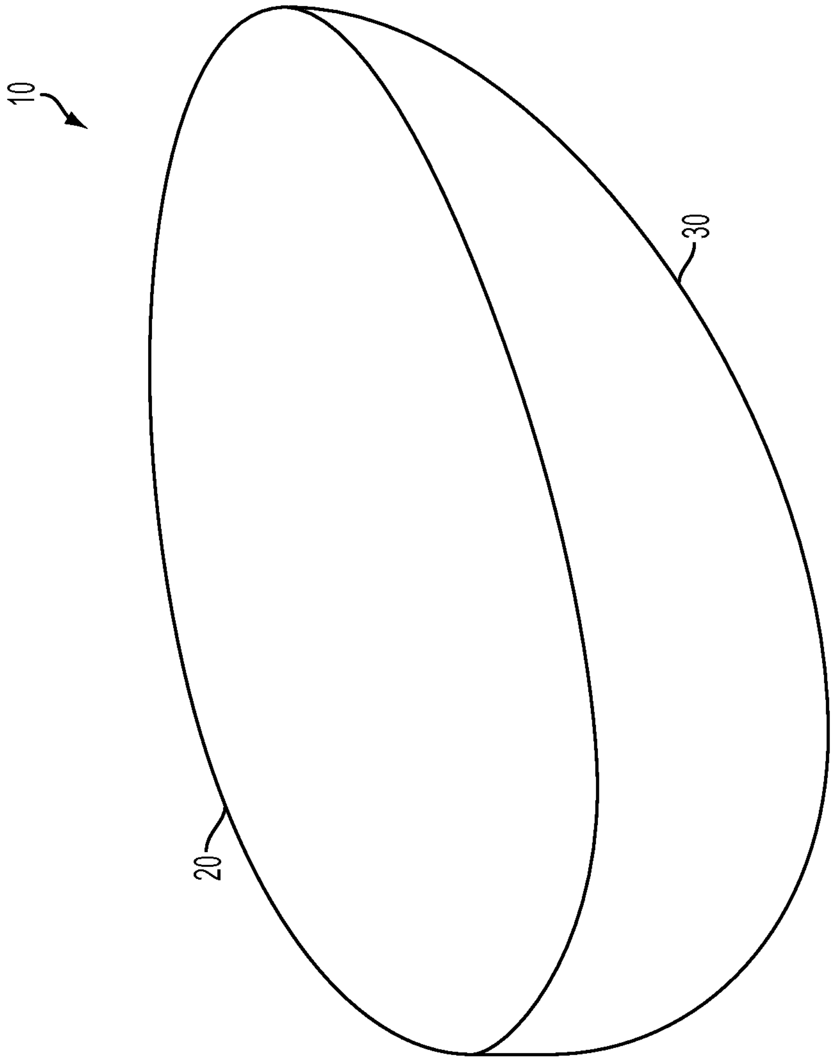
FIG. 5 is a perspective view of an EAS tag assembled.
Figure 6:
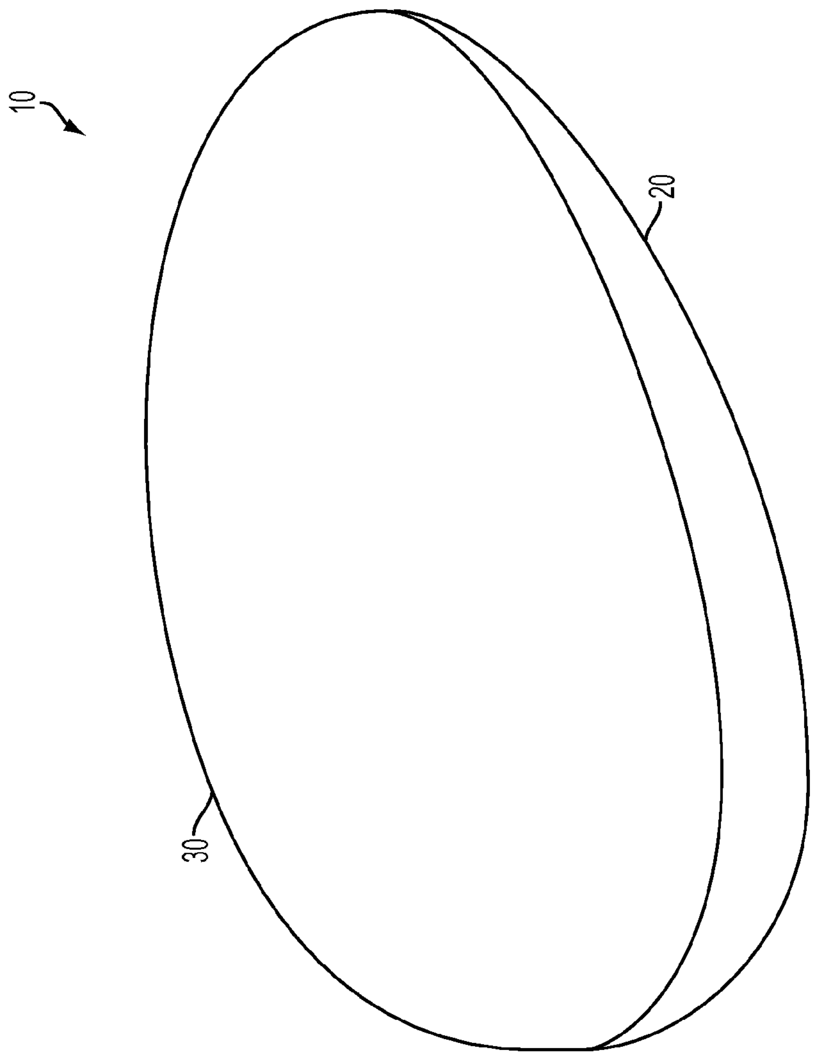
FIG. 6 is a second perspective view of an EAS tag assembled.

FIG. 5 is a perspective view of an EAS tag 10 with twist resisting features assembled. FIG. 6 is a second perspective view of an EAS tag 10 with twist resisting features assembled. The oblong oval shape of tag 10 and the matching contours of tag cap 20 and tag body 30 are shown apparent in FIGS. 5 and 6.

Figure 7:
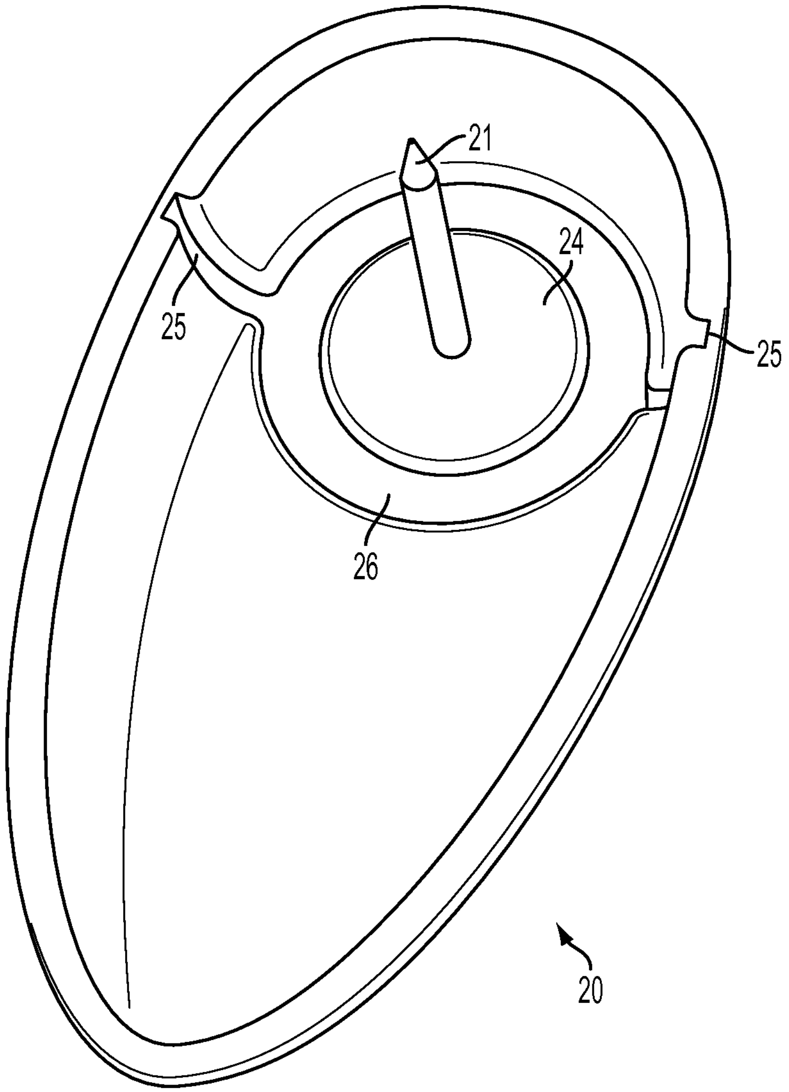
FIG. 7 is a perspective view of the underside of a tag cap of an EAS tag.

FIG. 7 is perspective view of the underside of an embodiment of tag cap 20 of an EAS tag. In the embodiment of FIG. 7, tack head 24 is molded into tag cap 20 and tack shaft 21 extends from tack head 24. Tag cap 20 has reduced thickness around tack head 24 and also leading from the edge of tag cap 20 to tack head 24. These areas of reduced thickness function as scores, or break lines, 25 and 26.

When EAS tag 10 is attached to an object to be protected by inserting tack shaft 21 of tag cap 20 into aperture 44 of tag body 30, a thief may attempt to forcibly remove tack shaft 21 from clutch 31 within tag body 30 by prying tag cap 20 from tag body 30. Alternatively, a thief may work the small end of tag cap 20 back and forth in a rotational manner to work tack shaft 21 out of clutch 31 located within tag body 30. When EAS tag 10 is handled in such a manner, peripheral break lines 25 running from the edge of tag cap 20 toward tack head 24 provide a starting point for a crack in tag cap 20 to place a limit on the amount of force transmitted to tack shaft 21. Concentric break line 26 directs a crack around tack head 24. If sufficient force is applied to tack cap 20, one or both ends of tack cap 20 may break away around tack head 24. This denies a thief effective purchase on tack head 24 for working tack shaft 21 out of clutch 44. While peripheral break lines 25 are intended to provide a crack path from the periphery of tag cap 20 to concentric break line 26, in some embodiments, or in some situations, a crack may start in concentric break line 26 and propagate around tack head 24 without initiation of the crack at the periphery of tag cap 20. In those cases, the entire shell 27 of tag cap would break off and have a hole where tack head 24 was previously. In the embodiments shown in FIGS. 7 and 8, the paths of reduced thickness create complete paths, or break lines, for the crack. That is to say, if a crack travels the entire length of the break line, a piece of the tag cap 20 will break off from the rest of the tag cap.

Figure 8:
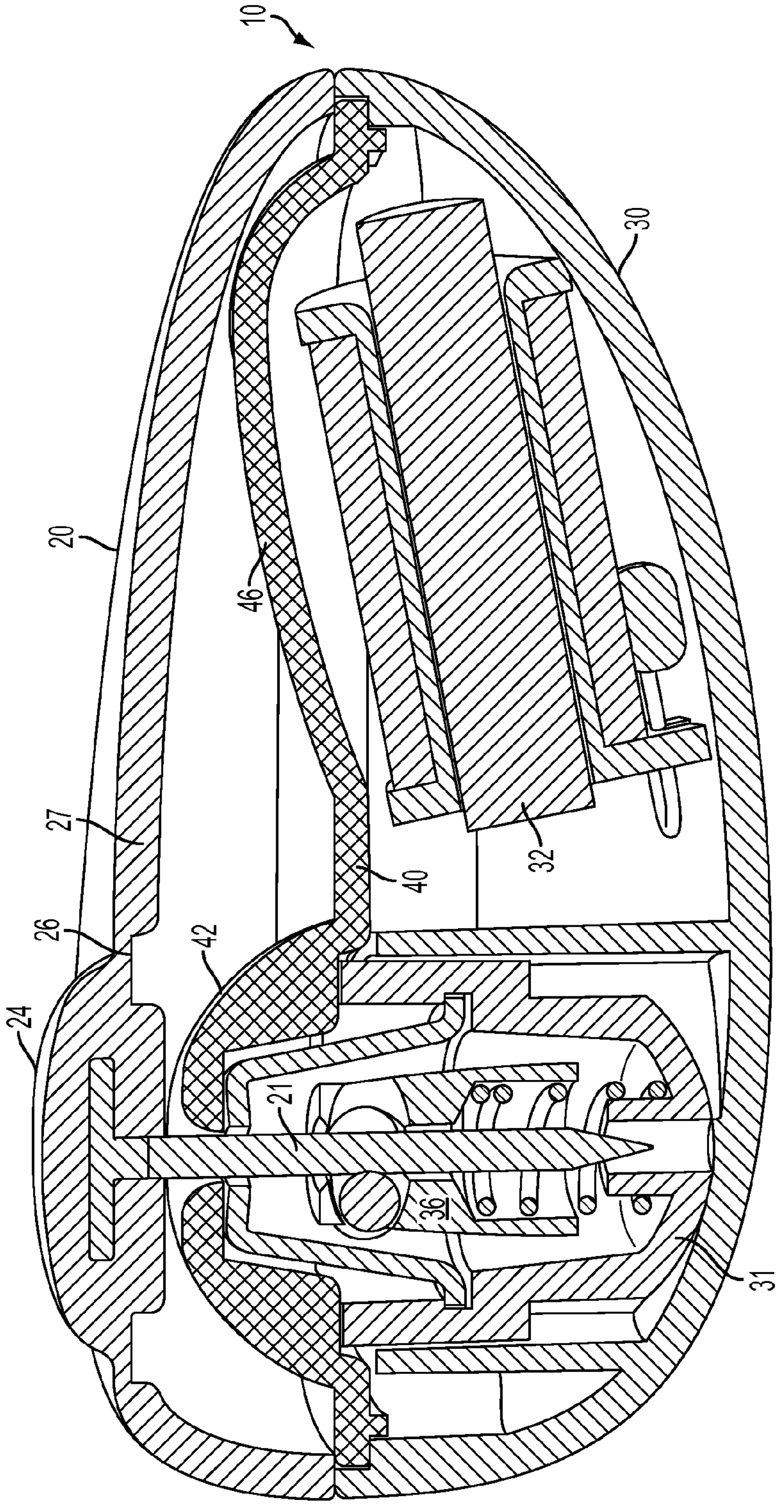
FIG. 8 is a side cross section view of a tag body and tag cap of an EAS tag.

FIG. 8 is a side cross section view of a tag body 30 and tag cap 20 of an EAS tag 10. In FIG. 8, clutch 31 may be seen beneath clutch dome 42 of top panel 40 and EAS signal element 32 may be seen beneath elongate dome 46 of top panel 40. The embodiment of EAS signal element 32 shown in FIG. 8 is core and coil type passive element, but other types of EAS signal elements could be employed. Clutch spindle 36 in clutch 31 is at least partially made of a magnetically attractable material. Application of a magnet to tag body 30 in proximity to the end of tack shaft 21 shifts clutch spindle 36 away from tack head 24 allowing tack shaft 21 to be withdrawn from clutch 31 and through aperture 44.

Figure 9:
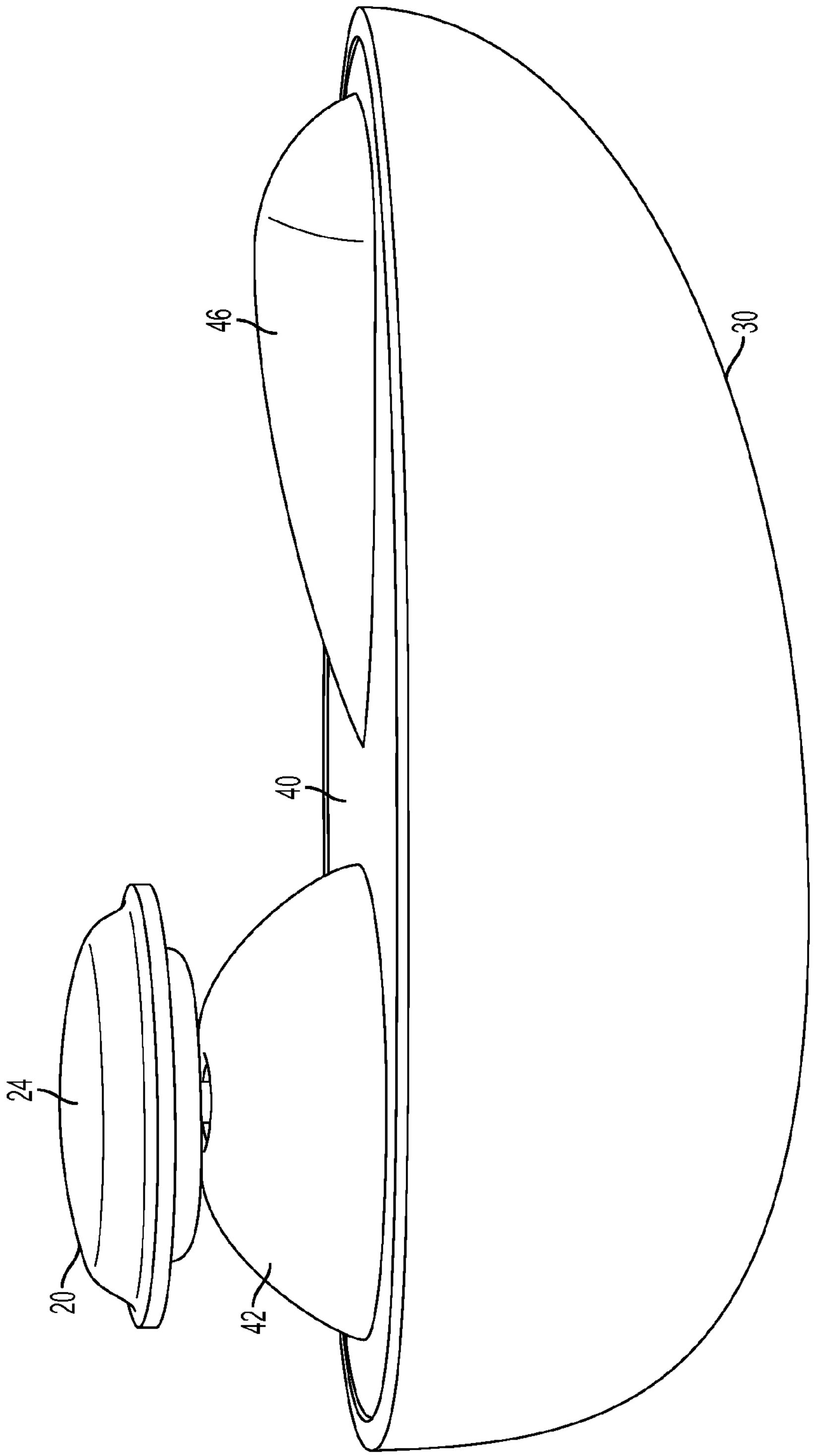
FIG. 9 is a side perspective view of the tag body and tag cap of an EAS tag, with the cover portion of the tag cap broken away.

FIG. 9 is a side perspective view the tag body 30 and tag cap 20 of EAS tag 10, with the cover portion, or shell, of tag cap 20 broken away. Tack head 24 remains to keep EAS tag 10 attached to an object to be protected. EAS tag 10 can be removed from the object by application of a magnet to tag body 30 opposite to tack head 24.

Figure 10:
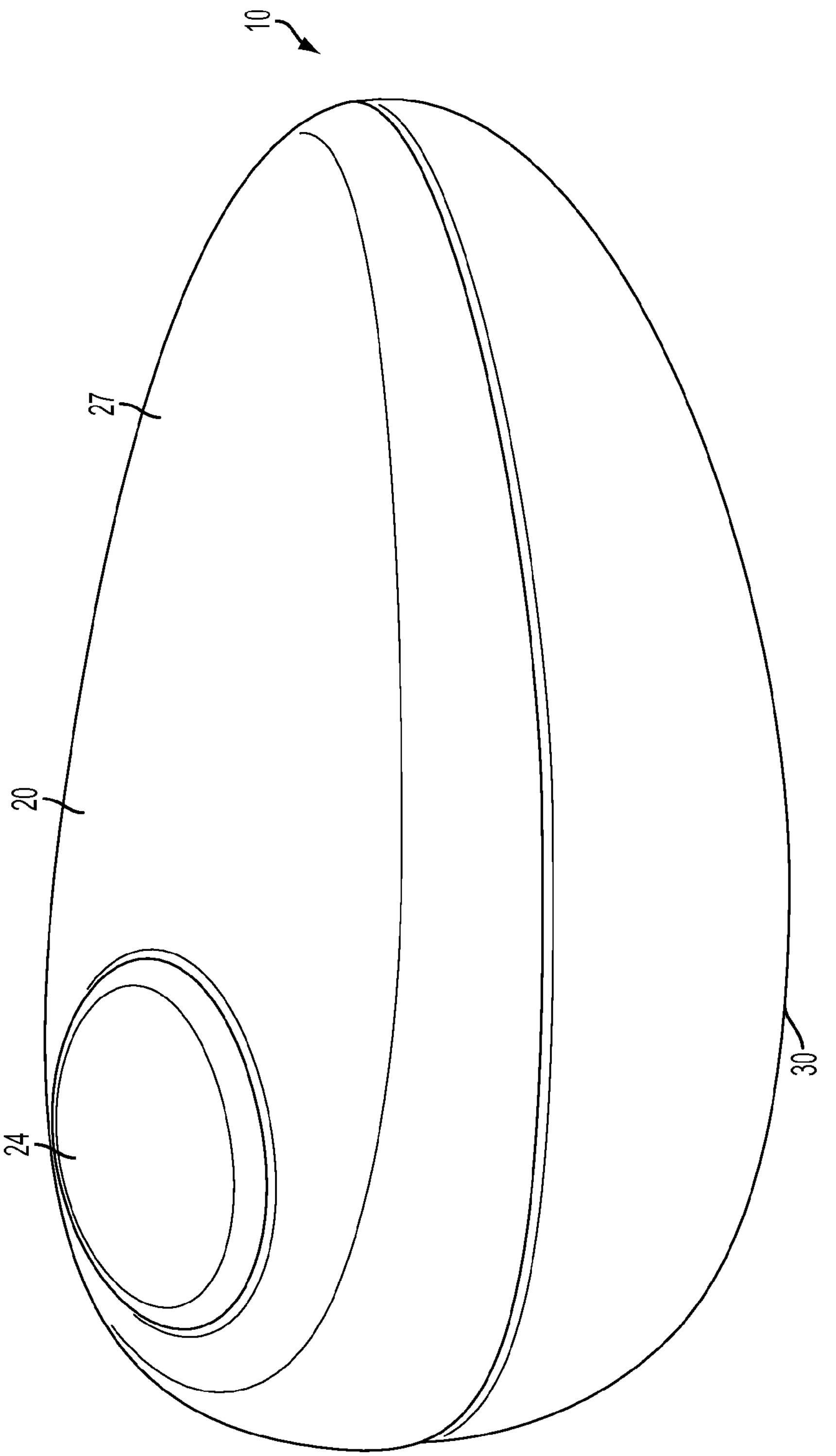
FIG. 10 is a perspective view of an EAS tag with twist preventing features with the tag cap and tag body assembled.

FIG. 10 is a perspective view of an EAS tag 10 with twist preventing features with tag cap 20 and tag body 30 assembled. Tack head 24 is visible and is surrounded by shell 27. The peripheries of tag cap 20 and tag body 30 match which gives an initial defense against twisting or working tag cap 20.

While the general shape of tag cap 20 and tag body 30 is oval, especially at their matching periphery, that need not be the only shape utilized. Other shapes of peripheries could be used. For example, even a circular periphery could be used as long as the tack shaft of the tag cap and the aperture of the tag body were not centered within the circular periphery.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

I claim:

1. An electronic article surveillance tag, comprising:

a tag cap comprising a concave shell having a concave surface, a tack head imbedded in said shell, a tack shaft extending from said tack head into the concavity of said shell, and a female feature projecting from said concave surface;

a tag body with a hollow interior housing an EAS sensor and housing a releasable clutch for receiving said tack shaft, said tag body having a top surface with an aperture through it to allow said tack shaft access to said releasable clutch, said top surface having a convex portion aligned with and fitting into said female feature when said tack shaft is inserted into said releasable clutch and said tag cap is assembled to said tag body;

wherein said aperture in said top surface does not pass through said convex portion of said top surface.

2. The electronic article surveillance tag of claim 1, wherein:

said shell of said tag cap comprises a path of reduced thickness to precipitate a crack in said shell when said tag cap is overstressed.

3. The electronic article surveillance tag of claim 2, wherein:

said path of reduced thickness intersects said edge of said shell.

4. The electronic article surveillance tag of claim 2, wherein:

said path of reduced thickness circumscribes said tack head.

5. An electronic article surveillance tag, comprising:

a tag cap comprising a concave shell, a tack head imbedded in said shell, a tack shaft extending from said tack head into the concavity of said shell, and a first interlocking element extending into the concavity of said shell;

a tag body with a hollow interior housing an EAS sensor and housing a releasable clutch for receiving said tack shaft, said tag body having a top surface with an aperture through it to allow said tack shaft access to said releasable clutch, said top surface having a second interlocking element;

wherein when said tack shaft is inserted into said releasable clutch and said tag cap is assembled to said tag body, said first interlocking element interlocks with said second interlocking element, preventing said tag cap and said tag body from rotating with respect to each other about said tack shaft.

6. The electronic article surveillance tag of claim 5, wherein:

said first interlocking element is a female element receiving said second interlocking element.

7. The electronic article surveillance tag of claim 5, wherein:

said shell of said tag cap comprises a path of reduced thickness to precipitate a crack in said shell when said tag cap is overstressed, said crack causing a portion of said tag cap to break away.

8. The electronic article surveillance tag of claim 7, wherein:

said path of reduced thickness to precipitate a crack provides a complete path for said crack.

9. The electronic article surveillance tag of claim 7, wherein:

said path of reduced thickness intersects at least one edge of said shell.

10. The electronic article surveillance tag of claim 7, wherein:

said path of reduced thickness circumscribes said tack head.

11. An electronic article surveillance tag, comprising:

a tag cap comprising a concave shell, a tack head imbedded in said shell, and a tack shaft extending from said tack head into the concavity of said shell, said concave shell having at least one path of reduced thickness to precipitate a crack in said shell when said tag cap is overstressed, said crack causing a portion of said tag cap to break away;

a tag body with a hollow interior housing an EAS sensor and housing a releasable clutch for receiving said tack shaft, said tag body having a top surface with an aperture through it to allow said tack shaft access to said releasable clutch.

* * * * *